(12) United States Patent
Jones (10) Patent No.: US 9,062,595 B2
(45) Date of Patent: Jun. 23, 2015

(54) TURBOCHARGER OPERATING SYSTEM AND METHOD FOR AN INTERNAL COMBUSTION ENGINE

(76) Inventor: Gregg Jones, Owosso, MI (US)

( * ) Notice: Subject to any disclaimer, the term of this patent is extended or adjusted under 35 U.S.C. 154(b) by 210 days.

(21) Appl. No.: 13/322,366

(22) PCT Filed: Nov. 18, 2011

(86) PCT No.: PCT/US2011/061398
§ 371 (c)(1),
(2), (4) Date: Nov. 23, 2011

(87) PCT Pub. No.: WO2012/074789
PCT Pub. Date: Jun. 7, 2012

(65) Prior Publication Data
US 2012/0177476 A1   Jul. 12, 2012

Related U.S. Application Data

(60) Provisional application No. 61/415,641, filed on Nov. 19, 2010.

(51) Int. Cl.
*F02B 33/44*   (2006.01)
*F04D 27/02*   (2006.01)
(Continued)

(52) U.S. Cl.
CPC ............... *F02B 39/14* (2013.01); *Y02T 10/144* (2013.01); *F02D 41/0007* (2013.01); *F02D 2200/024* (2013.01)

(58) Field of Classification Search
CPC ........... F02D 41/0007; F02D 2200/024; F02B 39/14; Y02T 10/144
USPC .................................. 60/605.3; 384/447, 517
See application file for complete search history.

(56) References Cited

U.S. PATENT DOCUMENTS 4,126,997 A * 11/1978 Henson .................... 60/605.3
4,364,717 A * 12/1982 Schippers et al. ............. 417/407
4,387,573 A    6/1983 Parker
(Continued)

FOREIGN PATENT DOCUMENTS

DE    199 59 485 A1    6/2001
JP    S52-66806 U      5/1977

OTHER PUBLICATIONS

Extended European search report issued in corresponding EP Patent Application and dated Oct. 13, 2013.

*Primary Examiner* — Audrey K Bradley
*Assistant Examiner* — Paolo Isada
(74) *Attorney, Agent, or Firm* — Carrier Blackman & Associates, P.C.; William D. Blackman; Joseph P. Carrier (57) ABSTRACT

A method of operating a turbocharger apparatus on an internal combustion engine, having a first oil circuit and a second oil circuit, includes steps of sensing a plurality of engine operating parameters via a plurality of sensors associated with the internal combustion engine; providing oil to the engine from the first oil circuit at a first pressure level; controlling operation of the second oil circuit for said engine via an electronic control unit, based on the sensed engine operating parameters; and applying a variable hydraulic preload to said first and second bearing assemblies via the operation of the second oil circuit, wherein oil from the second oil circuit is provided at a second pressure level which is different from the first pressure level. A system usable for carrying out such method is also described.

20 Claims, 9 Drawing Sheets

(51) Int. Cl.
*F02B 39/14* (2006.01)
*F02D 41/00* (2006.01)

(56) References Cited

U.S. PATENT DOCUMENTS

| | | |
|---|---|---|
| 4,475,567 A | 10/1984 | Kiser |
| 4,652,219 A | 3/1987 | McEachern, Jr. et al. |
| 4,657,412 A * | 4/1987 | McLarty et al. ............. 384/447 |
| 4,676,667 A | 6/1987 | Komatsu et al. |
| 4,789,253 A | 12/1988 | Perego |
| 4,798,523 A | 1/1989 | Glaser et al. |
| 4,926,641 A | 5/1990 | Keller |
| 5,051,005 A | 9/1991 | Duncan |
| RE34,276 E | 6/1993 | Glaser et al. |
| 5,253,985 A | 10/1993 | Ruetz |
| 5,388,917 A | 2/1995 | Hibi et al. |
| 5,735,676 A | 4/1998 | Loos |
| 6,042,273 A | 3/2000 | Thrasher |
| 6,123,462 A | 9/2000 | Crowell |
| 6,709,160 B1 | 3/2004 | Ward et al. |
| 6,735,952 B2 * | 5/2004 | Olsen ............... 60/778 |
| 7,371,011 B2 | 5/2008 | McKeirnan, Jr. |
| 7,476,090 B2 * | 1/2009 | Wood ............... 417/407 |
| 2013/0060417 A1 * | 3/2013 | Oriet et al. ............... 701/32.7 |

* cited by examiner

PRIOR ART

FIG. 6

PRIOR ART

FIG. 7

TURBOCHARGER OPERATING SYSTEM AND METHOD FOR AN INTERNAL COMBUSTION ENGINE

CROSS-REFERENCE TO RELATED APPLICATIONS

The present application is the U.S. National Phase of International Application PCT/US11/61398, filed 18 Nov. 2011, which claims priority under 35 U.S.C. 119(e) to U.S. provisional patent application 61/415,641, filed 19 Nov. 2010. The entire disclosure of each of the referenced priority documents, including specification, claims, and drawings, is incorporated by reference herein.

BACKGROUND OF THE INVENTION

1. Field of the invention

The present invention relates to turbochargers for internal combustion engines. More particularly, the present invention relates to a turbocharger control system including a main oil supply pump, a first regulated oil circuit operable to variably and selectively supply pressure-regulated oil to bearings of a turbocharger apparatus at a first pressure in order to hydraulically pre-load the bearings, and a second oil circuit operable to variably and selectively supply pressure-regulated oil to other portions of the turbocharger apparatus at a second pressure. The present invention also relates to an engine incorporating the improved turbocharger, and to a method of using the same.

2. Description of the Background Art

There are known turbocharger systems for controlling and operating turbocharger apparatus, which are widely used on internal combustion engines for vehicles. Internal combustion engines equipped with turbochargers generally decrease the overall weight of vehicles in which they are installed, improve performance of the vehicles, and enhance fuel efficiency.

Some examples of turbocharger apparatus are disclosed in drawings 1 and 2 of U.S. Pat. No. 4,387,573, which are reproduced as FIGS. 6 and 7 herein, in order to generally discuss the known functions of turbochargers. The entire disclosure of U.S. Pat. No. 4,387,573 is incorporated herein by reference, as background information regarding known turbocharger systems. The reference numbers used herein regarding FIGS. 6 and 7 are different from the reference numbers used in the original patent.

Figure 6:
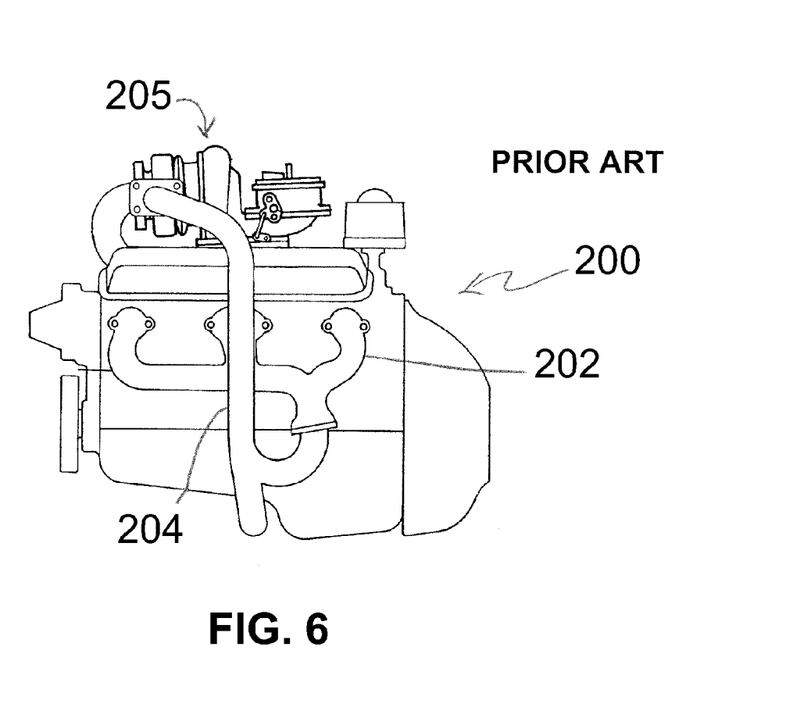
FIG. 6 is a side plan view of a prior art engine having a conventional turbocharger mounted thereon.
Figure 7:
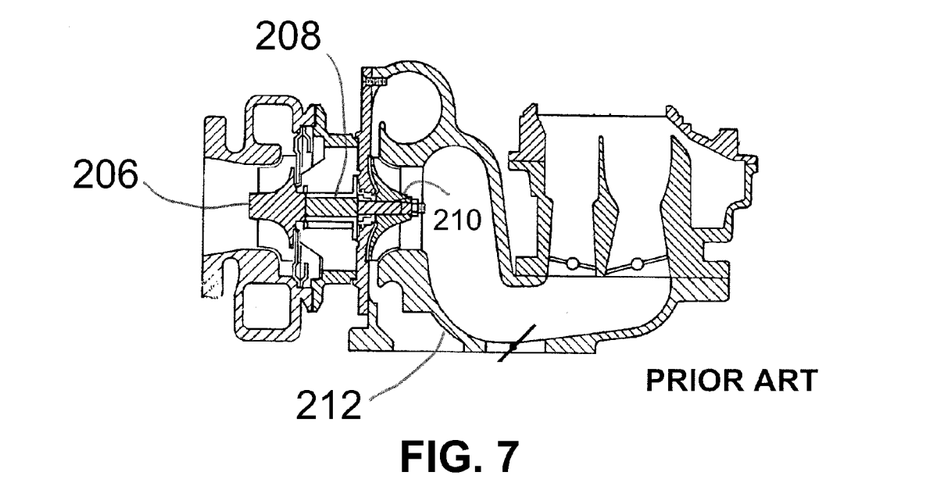
FIG. 7 is a cross-sectional view of the conventional turbocharger of FIG. 6.

As shown in FIGS. 6-7, in an internal combustion engine 200, it has been known to divert part of the engine exhaust flowing outwardly through the exhaust manifold 202, to feed such diverted exhaust flow through a turbo feed pipe 204 to a turbocharger 205, and to spin an exhaust turbine wheel 206 of the turbocharger 205 with such exhaust flow received from the internal combustion engine 200. The exhaust turbine wheel 206 is operatively attached to an intake-side turbine wheel 210, for concurrent rotation, via a connecting shaft 208.

Incoming intake air for combustion is compressed by the intake-side turbine wheel 210 to create high-density charge air, which is then routed into the intake manifold of the engine via an intake duct pipe 212, and is combined with fuel for burning inside of the engine 200.

A number of different designs are known for turbochargers. Examples of some of the known turbocharger designs include those described in U.S. Pat. No. 4,652,219 to McEachern, Jr. et al., U.S. Pat. No. 4,676,667 to Komatsu et al., U.S. Pat. No. 4,789,253 to Perego, U.S. Pat. No. 4,798,523 to Glaser et al., U.S. Pat. No. 5,735,676 to Loos, and U.S. Pat. No. 7,371,011 to McKiernan, Jr.

Other patents, on other various known machines having pre-loaded bearings therein, include U.S. Pat. No. 5,051,005 to Duncan, U.S. Pat. No. 5,388,917 to Hibi et al., and U.S. Pat. No. 6,042,273 to Thrasher.

While it has been known, under some circumstances, to use engine oil to hydraulically pre-load turbocharger bearings, the known designs have been limited to using engine oil supplied at the pressure provided by the first oil circuit. Such known designs have drawbacks, since they do not separately and selectively control and regulate pressure applied to turbocharger bearings for achieving pre-loading thereof.

When a turbocharged engine is idling and is relatively cool, it is not always necessary to provide highly pressurized oil to the turbocharger bearings. Indeed, under some circumstances, if oil is provided to the turbocharger bearings at an increased pressure during idling, such pressurized oil may increase the delay or lag time of the turbocharger, and thereby deteriorate engine performance.

Also, it is desired that the bearings are pre-loaded while taking into account operational factors, such as engine speed, turbocharger rotary speed, engine coolant temperature, and intake manifold pressure, for achieving optimal performance of the turbocharger. However, it is the applicant's understanding that conventional turbocharger operating systems do not take such parameters into consideration.

Although the known devices have some utility for their intended purposes, a need still exists in the art for an improved turbocharger operating system and method for variably pre-loading turbocharger bearings. In particular, there is a need for an improved turbocharger operating system and method which will promote extended life of turbocharger bearings, and which will enhance engine performance.

Accordingly, it is one of the objects of the present invention to provide a method and apparatus for turbocharging an internal combustion engine, in which oil pressure applied to turbocharger bearing assemblies is controlled and regulated separately from a main engine oil supply, for variably and selectively controlling hydraulic pre-loading of the turbocharger bearings.

It is another object of the present invention to provide two separate, independently controlled oil circuits for supplying oil at different regulated pressures to different parts of a turbocharger apparatus.

SUMMARY OF THE INVENTION

In order to achieve the above objects, the present invention according to a first aspect thereof provides a turbocharger system including an electronic control unit; a first oil supply circuit operable to provide oil at a first pressure level; a second oil circuit which is operable to provide oil at a second pressure level which may be different from the first pressure level, and a turbocharger apparatus. The operation of each of the respective oil circuits may be separately controlled by the electronic control unit. The turbocharger apparatus includes a center housing having a hollow central bore formed therethrough and having first, second and third oil routing channels formed therein. The first and second oil routing channels are in fluid communication with the first oil circuit.

The turbocharger apparatus further includes a first cylindrical sleeve which fits inside of the center housing, the first cylindrical sleeve having a first end with a first seat formed therein and a second end with a second seat formed therein, and a central portion disposed between the first and second ends; a first disc member which fits into the first seat, the first disc member having a first fluid supply passage formed therethrough which communicates with the first oil routing channel of the center housing. The first fluid passage is configured and arranged to receive oil from the second oil circuit.

The turbocharger apparatus further includes a first bearing assembly which fits into the first seat adjacent the first disc member, the first bearing assembly receiving oil from the first fluid supply passage; a second disc member which fits into the second seat, the second disc member having a second fluid supply passage formed therethrough which communicates with the second oil routing channel of the center housing, the second fluid supply passage also configured and arranged to receive oil from the second oil circuit; a second bearing assembly which fits into the second seat adjacent the second disc member, the second bearing assembly receiving oil from the second fluid supply passage; and a second cylindrical sleeve which fits coaxially inside of the first cylindrical sleeve. The first and second disc members receive respective ends of the second cylindrical sleeve therein.

The turbocharger apparatus also includes a turbine member including a shaft portion which extends through the central bore of the center housing and through the second cylindrical sleeve. The turbocharger apparatus further includes an intake turbine attached to a first end of the shaft portion, and an exhaust turbine attached to a second end of the shaft portion.

Optionally, the turbocharger apparatus may further include a spring which is disposed in the central portion of the first cylindrical sleeve between the first and second disc members, and which surrounds the second cylindrical sleeve.

The first oil circuit is operable by the electronic control unit to apply a selectively variable hydraulic pressure to the first and second bearing assemblies for achieving desired preloading of the first and second bearing assemblies. The second oil circuit may be separate from the first oil circuit, or may branch off of the first oil circuit and be separately controlled.

The present invention according to a second aspect thereof provides a method of operating a turbocharger apparatus on an internal combustion engine having a first oil circuit and a second oil circuit. The method of operating the turbocharger apparatus includes the steps of sensing a plurality of engine operating parameters via a plurality of sensors associated with the internal combustion engine; providing oil to the turbocharger apparatus from a first oil circuit at a first pressure level; controlling operation of a second oil circuit for said engine via an electronic control unit, based on the sensed engine operating parameters; and applying a variable hydraulic preload to said first and second bearing assemblies via the operation of said first or second oil circuit, which supplies oil at a second pressure level which may be different from the first pressure level.

The present invention according to a third aspect thereof, in addition to the second aspect, is characterized in that the sensed engine operating parameters include engine speed, turbocharger rotary speed, intake manifold pressure, engine temperature, and/or exhaust back pressure.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Descriptions will be provided below of selected illustrative embodiments of the present invention as illustrative examples of the present invention, supported by and shown in the accompanying drawings. It should be understood that only structures considered necessary for clarifying the present invention are described herein. Other conventional structures, and those of ancillary and auxiliary components of the system, will be known and understood by those skilled in the art.

Figure 1A:
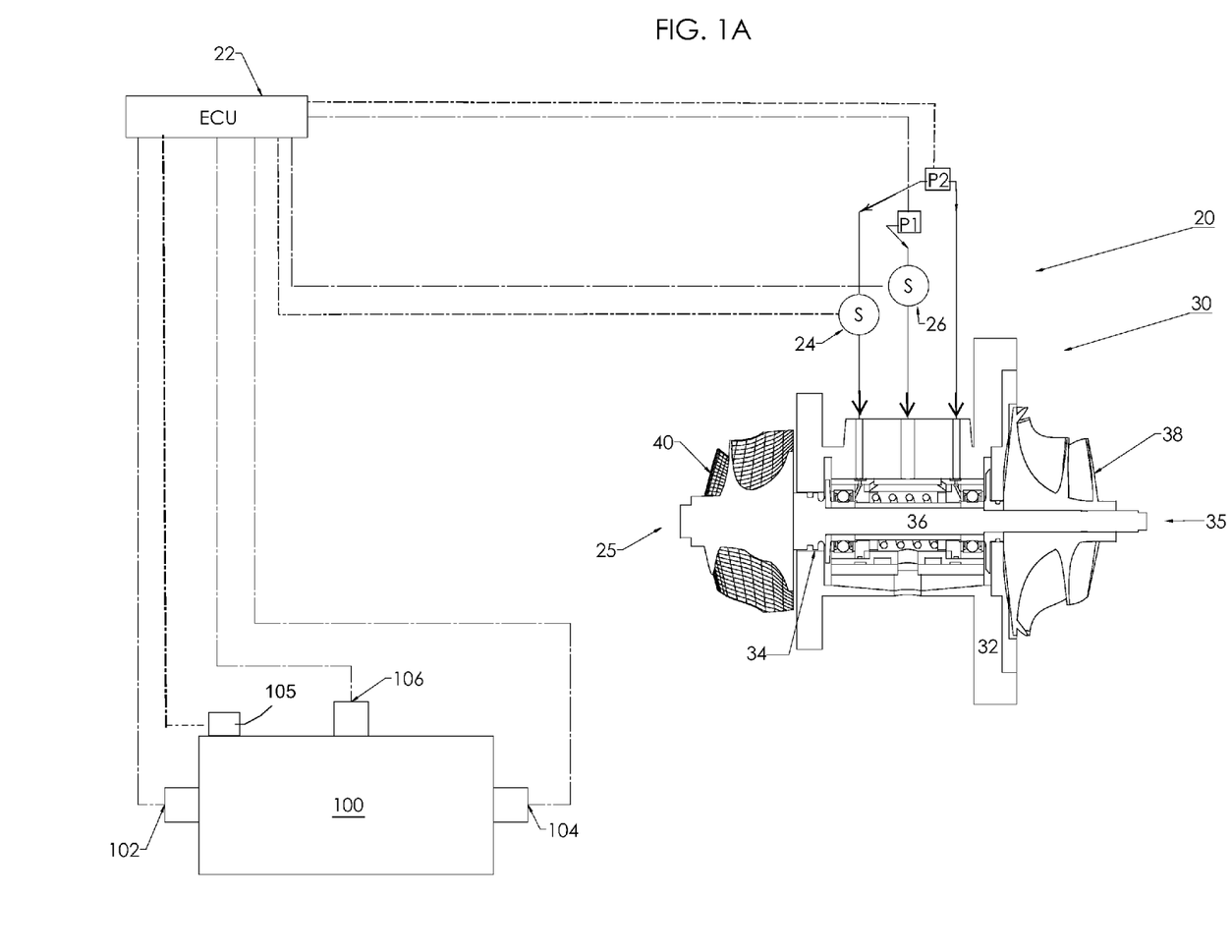
FIG. 1A is a schematic diagram of a turbocharger operating system according to a first selected illustrative embodiment of the present invention.

Referring now to FIG. 1A, a turbocharger system according to a first selected illustrative embodiment of the present invention is shown generally at 20. The turbocharger system 20 is provided for use on an internal combustion engine 100, which is depicted schematically as a rectangular box in the drawing. The internal combustion engine 100 may be a diesel engine, a gasoline engine or a hybrid fuel engine. The engine 100 may be used with cars, transport trucks or marine vehicles.

The internal combustion engine 100 is provided with a plurality of sensors, which may include an engine speed sensor (rpm sensor) 102, a coolant temperature sensor 104, a turbocharger rotary speed sensor 105, and an intake manifold pressure sensor 106.

The turbocharger system 20 includes an electronic control unit 22, a first oil supply circuit P1 operable to provide lubricating oil at a first pressure level, and a second oil supply circuit P2 which is operable to provide oil at a second pressure level. It will be understood that each of the first and second oil supply circuits P1, P2, respectfully, includes a return flow line (not shown) for completing the circuit. The second pressure level is controlled such that it may be same as, or different from the first pressure level at any given set of operating parameters. As further described herein, the first and second oil supply circuits P1, P2 are sufficiently separated from one another so as to maintain separate and independent hydraulic pressures therein, such that they may be independently controlled by the ECU 22, and may be operated at different pressures from one another.

In the depicted embodiment of the turbocharger system 20 shown in FIG. 1A, the first oil circuit $P_1$ is the first oil circuit for the engine 100. However, the first oil circuit $P_1$ may be separately controlled from the pressure provided to the engine by the main oil pump of the engine.

Operation of each of the first and second oil circuits $P_1$, $P_2$ is controlled by the electronic control unit 22. Two oil pressure sensors 24, 26 are also provided, with a respective one of the sensors in each of the oil circuits, to measure the respective oil pressures in each of the first and second oil circuits $P_1$, $P_2$. During engine operation, data from the pressure sensors 24, 26 is sent to, and continuously monitored by the electronic control unit 22.

Figure 1B:
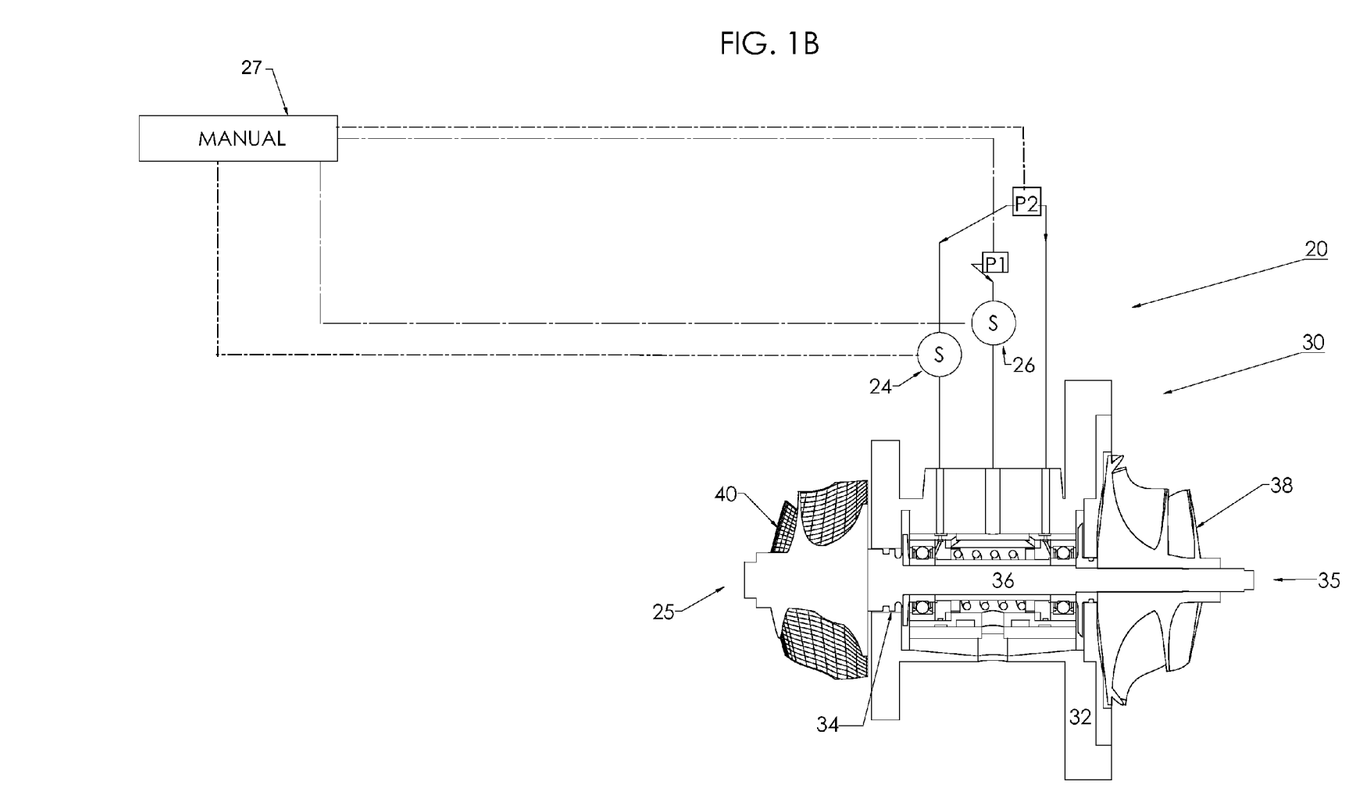
FIG. 1B is a schematic diagram of a turbocharger operating system according to a second illustrative embodiment of the present invention.
Figure 1C:
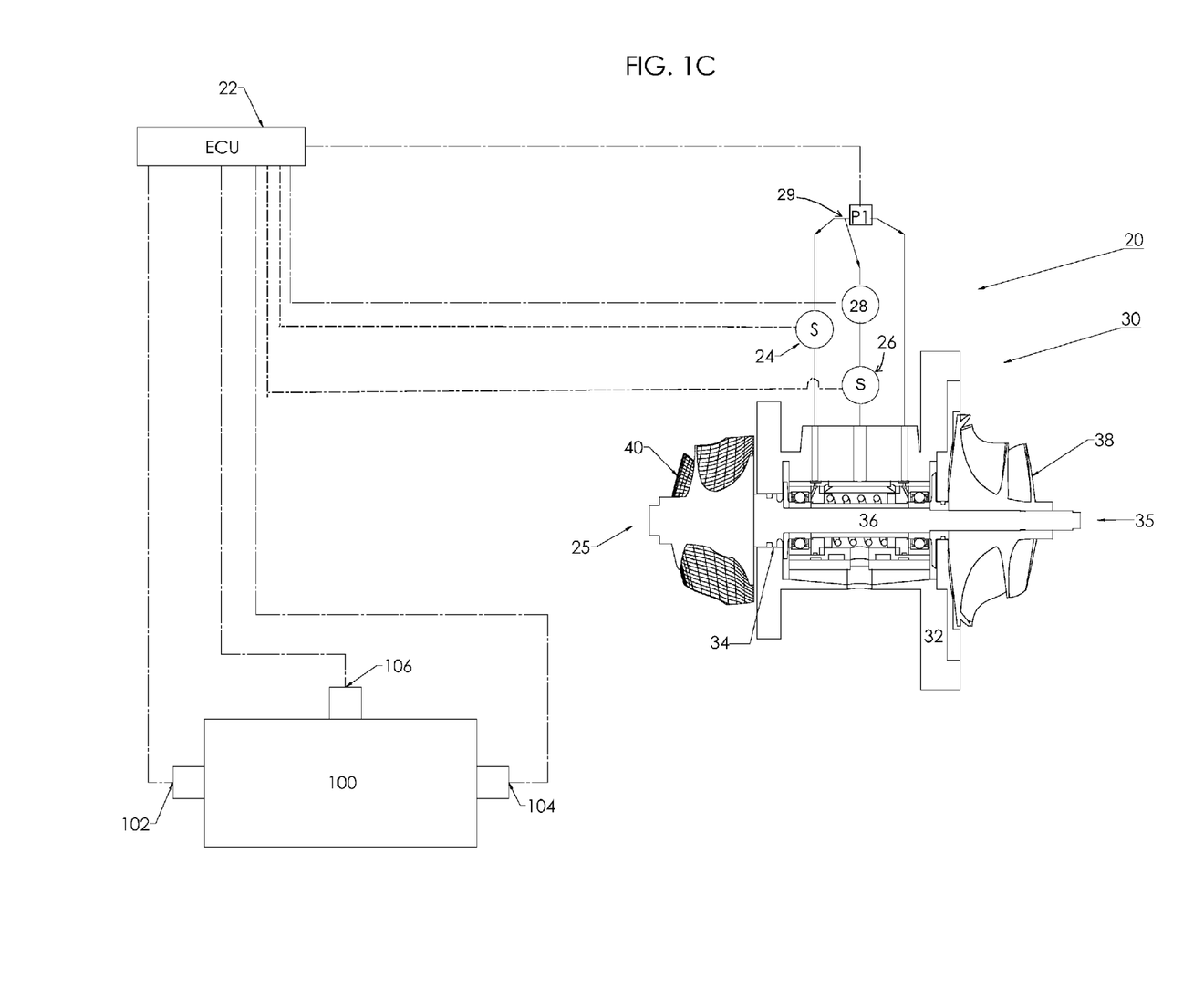
FIG. 1C is a schematic diagram of a turbocharger operating system according to a third illustrative embodiment of the present invention.
Figure 2A:
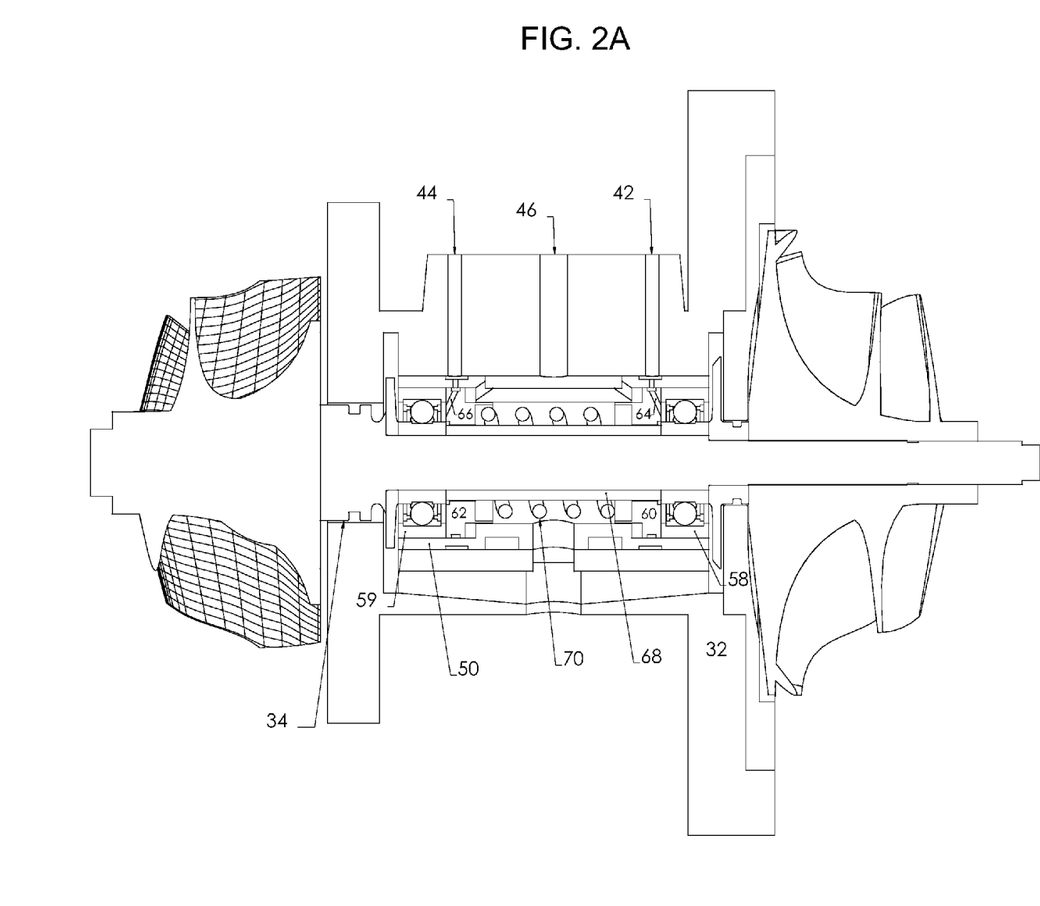
FIG. 2A is a cross-sectional view of an internal portion of a turbocharger assembly.
Figure 2B:
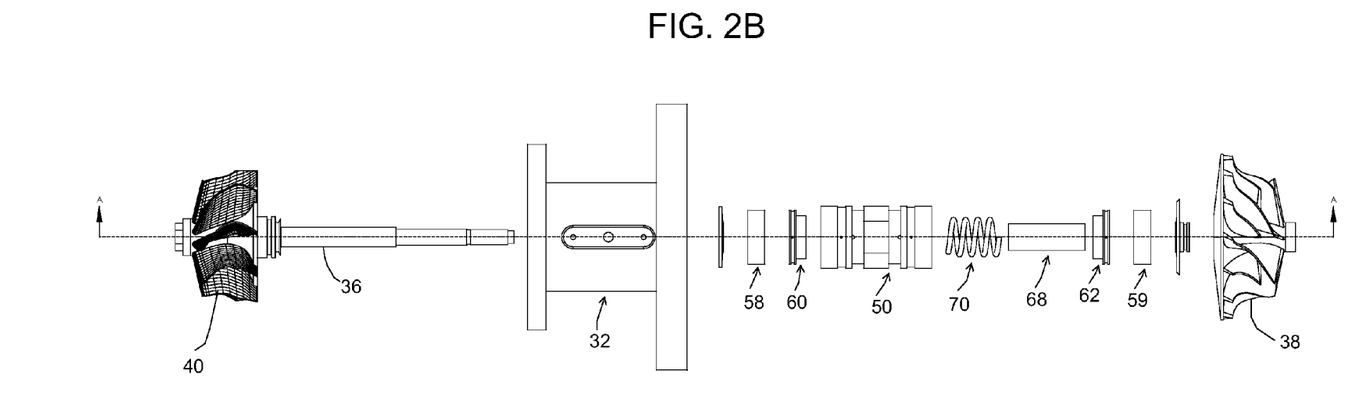
FIG. 2B is an exploded plan view showing components of the internal portion of the turbocharger assembly of FIG. 2A.
Figure 2C:
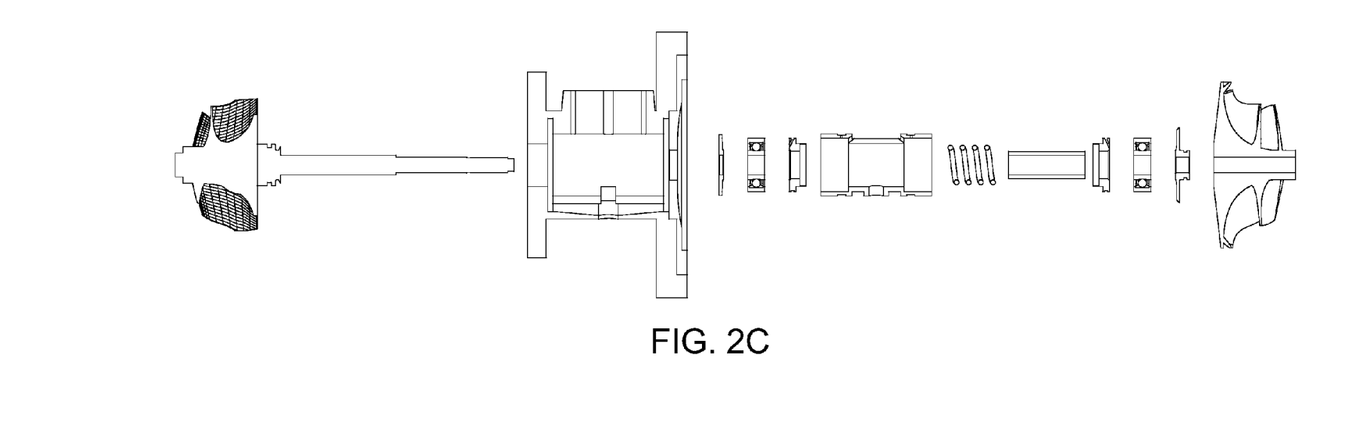
FIG. 2C is an exploded cross-sectional view showing components of the internal portion of the turbocharger assembly of FIG. 2A.
Figure 3A:
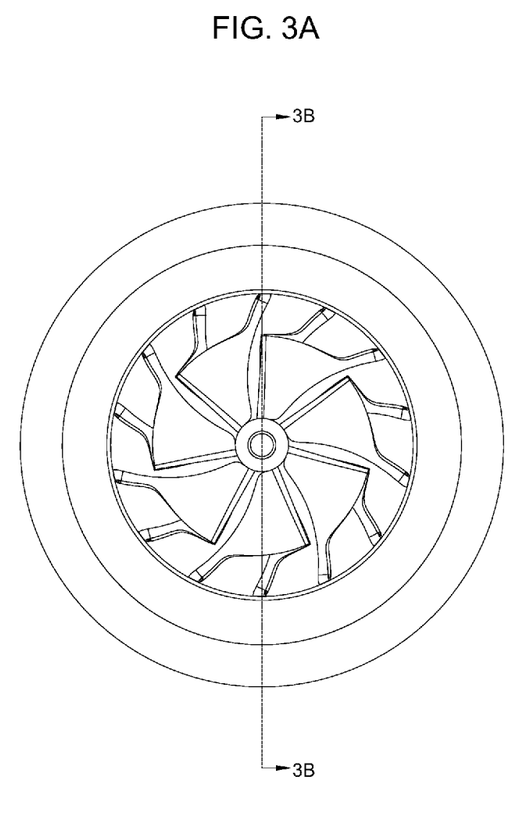
FIG. 3A is an end plan view of the turbocharger assembly component of FIGS. 2A-2C.
Figure 3B:
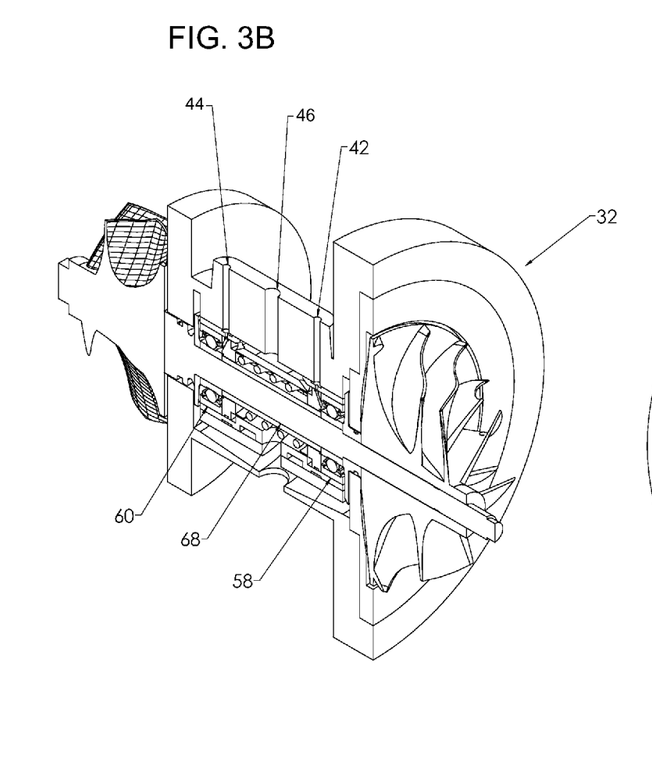
FIG. 3B is a perspective view, partially in cross-section, of the turbocharger assembly component of FIGS. 2A-2C.

The turbocharger system 20 also includes a turbocharger apparatus 25, as will be further discussed herein. A turbocharger core portion 30 of the turbocharger apparatus 25 is shown in FIGS. 1-3, and those skilled in the relevant art will realize that the turbocharger apparatus includes many additional components, which have been omitted from the drawing for purposes of illustration. Portions of the turbocharger apparatus 25 outside of the core portion 30, including an outer housing and air flow channels (not shown), are generally conventional in construction.

Referring now to FIGS. 1A and 2A-2C, the turbocharger core portion 30 includes a center housing 32 having a hollow central bore 34 formed therein, and a turbine member 35 comprising a shaft 36 which extends through the central bore of the center housing 32. The turbine member 35 also includes an intake turbine (compressor) 38 affixed to a first end of the shaft 36, and an exhaust turbine 40 affixed to a second end of the shaft.

As will be understood by those in the art, during engine operation, exhaust gas from the engine 100 is circulated past the exhaust turbine 40 in a manner to cause rotation thereof. Since the exhaust turbine 40 is integrally attached to the intake turbine 38 via the shaft 36, the turbine member 35 rotates together as an integrated unit. The intake turbine 38 is arranged to compress incoming air for combustion, and such compressed intake air is then routed into the intake manifold and combined with fuel inside of the engine to provide a compressed air/fuel mixture, which is then burned to provide increased power, as compared with a naturally aspirated engine.

Referring also to FIGS. 2A and 3B, it will be seen that in addition to the central bore 34, the center housing 32 also has first, second and third oil routing channels 42, 44 and 46 formed therein. The first and second oil routing channels 42, 44 are spaced apart from one another and are in fluid communication with the second oil circuit $P_2$, and the centrally located third oil routing channel 46 is fed by the first oil circuit $P_1$.

The turbocharger core portion 30 also includes a first cylindrical sleeve 50 (FIGS. 2B and 4), which fits inside of the center housing 32. As seen best in FIG. 4, the first cylindrical sleeve has a first end 51 with a first seat 52 formed therein, a second end 53 with a second seat 54 formed therein, and a central portion 55 disposed between the first and second ends. The central portion 55 has a main outlet aperture 56 formed through a side wall thereof, as shown.

The turbocharger core portion 30 also includes first and second disc members 60, 62 which fit respectively into the first and second seats 52, 54. As best seen in FIG. 2A, the first disc member 60 has a first fluid supply passage 64 formed therethrough which communicates with the first oil routing channel 42 of the center housing, where the first fluid supply passage is configured and arranged to receive oil from the second oil circuit P2. Similarly, the second disc member 62 has a second fluid supply passage 66 formed therethrough which communicates with the second oil routing channel 44 of the center housing 32, the second fluid supply passage also configured and arranged to receive oil from the second oil circuit P2.

Figure 4:
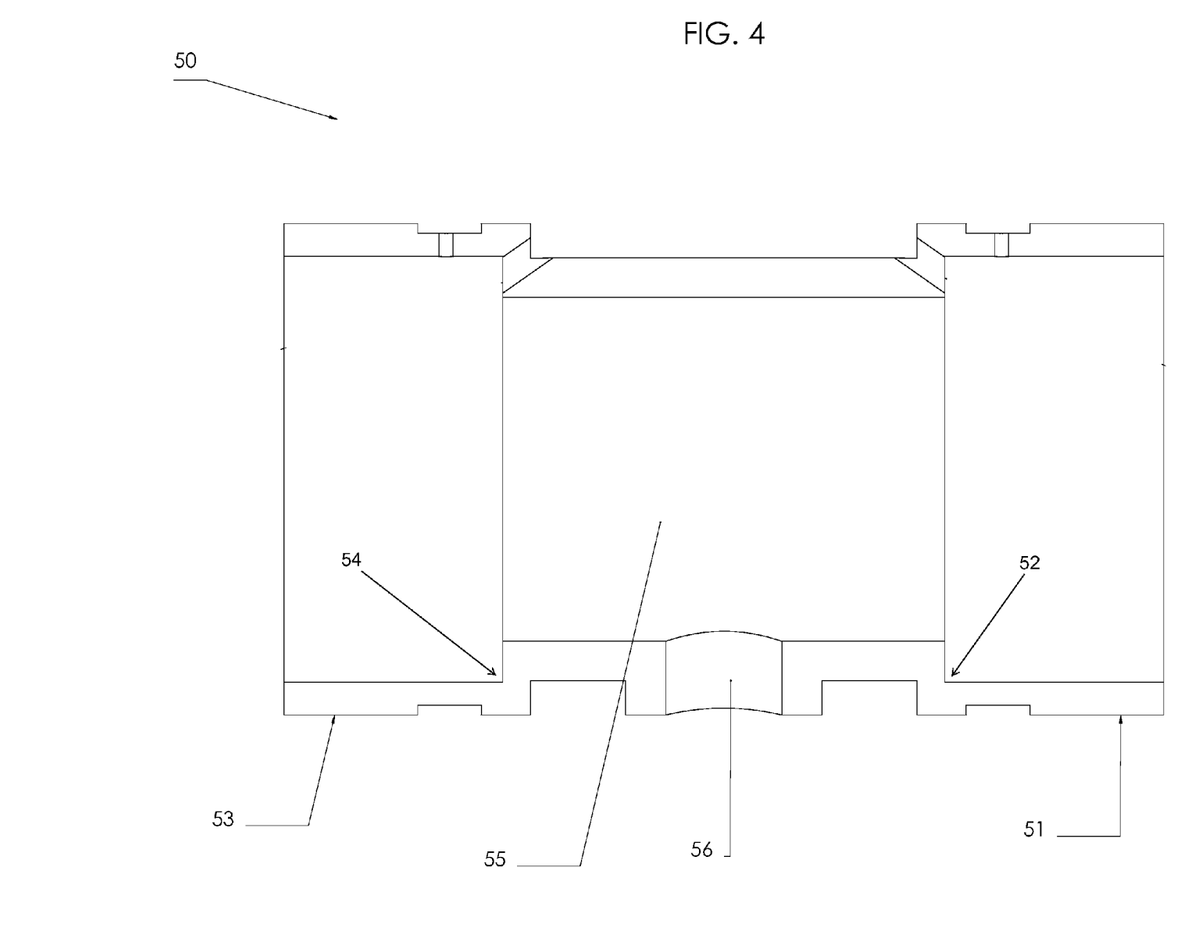
FIG. 4 is a cross section of a first cylindrical sleeve of a core portion of the turbocharger assembly.

The turbocharger core portion 30 also includes first and second bearing assemblies 58, 59 which fit into the first and second seats 52, 54, respectively outside of the first and second disc members 60, 62, as shown in FIGS. 2-4. The first bearing assembly 58 receives oil from the first oil routing channel 42 via the first fluid supply passage 64. Similarly, the second bearing assembly 59 receives oil from the second oil routing channel 44 via the second fluid supply passage 66. It will be understood that the first and second bearing assemblies 58, 59 are spaced apart, as shown, so as to be axially separated from one another.

The turbocharger core portion 30 also includes a second cylindrical sleeve 68 which fits coaxially inside of the first cylindrical sleeve 50, wherein each of the first and second disc members 60, 62 receives a respective corresponding end of the second cylindrical sleeve therein.

Optionally, the turbocharger core portion 30 may also include a spring 70 which is disposed in the central portion 55 of the first cylindrical sleeve 50 between the first and second disc members 60, 62, and also surrounding the second cylindrical sleeve 68. Where used, the spring 70 may be provided as a compression-type coil spring, which exerts an outward pressure on the disc members 60, 62 to press them against the bearing assemblies 58, 59 and to thereby provide a predetermined level of mechanical preload to the bearing assemblies.

During engine operation, the first and second oil circuits P1, P2 are independently operable by the electronic control unit 22 to apply a selectively variable hydraulic pressure to the first and second bearing assemblies 58, 59 and to achieve a desired hydraulic pre-loading thereof. The electronic control unit 22 receives input from various sensors on the engine 100, including the engine speed sensor 102, the turbocharger rotary speed sensor 105, the coolant temperature sensor 104, and the intake manifold pressure sensor 106. The electronic control unit 22 may further receive additional inputs from other sensors mounted in the vehicle, such as an exhaust back pressure sensor (not shown), for providing additional data used in controlling operation of the first and second oil circuits P1, P2.

Method of Operation

Figure 5:
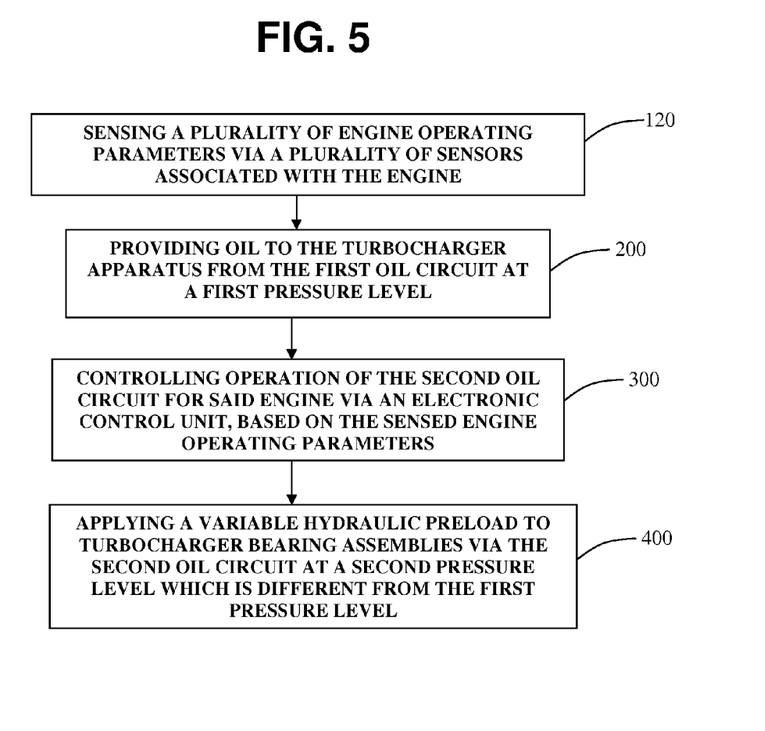
FIG. 5 is a flowchart showing method steps of operating a turbocharger apparatus on an internal combustion engine.

The present invention also relates to a method of operating the turbocharger apparatus 30 on the internal combustion engine 100 having a first oil circuit $P_1$ and a second oil circuit $P_2$. An illustrative method hereof, as shown in FIG. 5, includes a first step (STEP 102) of sensing a plurality of engine operating parameters via a plurality of sensors 24, 26, 102, 104, 105, 106 associated with the internal combustion engine. The sensed engine operating parameters may include engine speed, turbocharger rotary speed, intake manifold pressure, engine temperature, oil pressure, and exhaust back pressure, as well as other desired parameters as needed.

The illustrative method hereof, as shown in FIG. 5, also includes steps of providing oil to the turbocharger apparatus 25 from the first oil circuit $P_1$ at a first pressure level (STEP 200), and controlling operation of the second oil circuit $P_2$ for the engine via an electronic control unit 22, based on the sensed engine operating parameters (STEP 300).

The illustrative method hereof also includes a step of applying a variable hydraulic pressure to the first and second bearing assemblies 58, 59 for achieving desired pre-loading thereof via the operation of at least one of the first and second oil circuits P1, P2, wherein oil from the second oil circuit P2 is provided at a second pressure level which is different from the first pressure level (STEP 400). However, if required, oil from the man oil circuit P2 is provided at a second pressure level which may be same as the first pressure level.

Second Embodiment

A second, slightly modified embodiment of the present invention is shown in FIG. 1B. The embodiment of FIG. 1B is generally similar to that described above in connection with the first embodiment, except as specifically described as different herein. In the second embodiment, the level of hydraulic pressure provided for preloading the turbocharger bearings 58, 59 is controlled by a manual control valve 27 which is disposed inside of the vehicle and manually operated by the vehicle's driver or operator. The manual control valve 27 may include separate controls for each of the primary and secondary oil circuits $P_1$, $P_2$, and pressure gauges or readouts may be provided in the engine compartment to display the instantaneous pressures in each of the hydraulic circuits $P_1$, $P_2$.

Third Embodiment

A third, slightly modified embodiment of the present invention is shown in FIG. 1C. The embodiment of FIG. 1C is generally similar to that described above in connection with the first embodiment, except as specifically described as different herein. In the third embodiment, a single oil source P1 provides oil from a single source to each of the first and second oil supply circuits, and the pressure provided to the central oil passage of the central housing may be further regulated by a computer-controlled pressure control valve 28 provided downstream of a branch point 29.

Advantages of the Present Invention

The present invention is advantageous because in comparison to conventional systems, less oil is required for achieving pre-loading of the first and second bearing assemblies. Separate oil supply may be established for pre-loading the first and second bearing assemblies. A better control of pre-loading of the bearings can be achieved because the pressure applied to the bearing assemblies is separately and selectively controlled. Also, pre-loading of the bearing assemblies can be reduced, as desired, at low engine speed. Further, pre-loading of the bearing assemblies can be adjusted for different types of vehicles which have different upper limits of speed of turbochargers, e.g., 80,000 to 90,000 rpm for trucks, and 150,000 to 160,000 rpm for cars.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A turbocharger system comprising:
an electronic control unit;
a turbocharger apparatus;
a first oil circuit operable to provide oil to an internal cavity of the turbocharger apparatus at a first pressure level;
a second oil circuit which is operable to provide oil to the turbocharger apparatus at a second pressure level which is different from the first pressure level, wherein the first and second oil circuits are sufficiently separated from one another so as to maintain separate and independent hydraulic pressures therein, such that they may be operated at different pressures from one another;
wherein operation of at least one of the first and second oil circuits is controlled by the electronic control unit; and
wherein said turbocharger apparatus, comprises:
a center housing having a hollow central bore formed therethrough and having first, second and third oil routing channels formed therein, wherein the first and second oil routing channels are in fluid communication with the second oil circuit;
a first cylindrical sleeve which fits inside of the center housing, the first cylindrical sleeve having a first end with a first seat formed therein and a second end with a second seat formed therein, and a central portion disposed between the first and second ends;
a first disc member which fits into the first seat, the first disc member having a first fluid supply passage formed therethrough which communicates with the first oil routing channel of the center housing, the first fluid passage configured and arranged to receive oil from the second oil circuit;
a first bearing assembly which fits into the first seat adjacent the first disc member, the first bearing assembly receiving oil from the first fluid supply passage;
a second disc member which fits into the second seat, the second disc member having a second fluid supply passage formed therethrough which communicates with the second oil routing channel of the center housing, the second fluid supply passage also configured and arranged to receive oil from the second oil circuit;
a second bearing assembly which fits into the second seat adjacent the second disc member, the second bearing assembly receiving oil from the second fluid supply passage;
a second cylindrical sleeve which fits coaxially inside of the first cylindrical sleeve, wherein the first and second disc members receive respective ends of the second cylindrical sleeve therein; and
a turbine member comprising a shaft portion which extends through the central bore of the center housing and through the second cylindrical sleeve, an intake turbine attached to a first end of the shaft portion, and an exhaust turbine attached to a second end of the shaft portion;
wherein at least one of the first and second oil circuits is operable by the electronic control unit to apply a selectively variable hydraulic preload to the first and second bearing assemblies.

2. A turbocharger system according to claim 1, further comprising a turbocharger rotary speed sensor, wherein said electronic control unit controls operation of at least one of the first and second oil circuits for achieving desired oil pressure based on input received from the turbocharger rotary speed sensor.

3. A turbocharger system according to claim 2, wherein said electronic control unit is operable to control at least one of the first and second oil circuits such that a reduced pre-load is applied to the bearing assemblies at a low engine speed, and increased pre-load is applied to the bearing assemblies at a high engine speed.

4. A turbocharger system according to claim 1, wherein the second oil circuit is separately controlled from the first oil circuit.

5. A turbocharger system according to claim 1, further comprising a spring which is disposed in the central portion of the first cylindrical sleeve between the first and second disc members, and which surrounds the second cylindrical sleeve.

6. A turbocharger system according to claim 1, wherein the second oil circuit receives oil from a source different from an oil pan of the engine.

7. A turbocharger system according to claim 1, further comprising first and second oil pressure sensors operatively associated with the first and second oil routing channels, respectively; wherein said control unit is configured to receive input from said oil pressure sensors, and further control the operation of the second oil circuit for regulating the oil pressure applied the first and second bearing assemblies for achieving desired pre-loading thereof based in part on the input received from said oil pressure sensors.

8. A turbocharger system for an internal combustion engine, said turbocharger system comprising:
   a turbocharger apparatus operatively connected with the engine, said turbocharger apparatus comprising:
      an elongated center housing having a hollow central bore formed therethrough, and having first, second and third oil routing channels formed therein,
      a turbine member comprising a shaft portion extending through the central bore of the elongated center housing, said turbine member having an intake turbine attached to a first end of the shaft portion, and an exhaust turbine attached to a second end of the shaft portion;
      a first bearing assembly and second bearing assembly, each operatively supporting said turbine member; wherein said first and second bearing assemblies are axially separated from each other; said first bearing assembly connected to said first oil routing channel, and said second bearing assembly connected to said second oil routing channel;
   an electronic control unit;
   a first oil circuit connected to said third oil routing channel, and operable to provide oil to an internal cavity of the turbocharger apparatus at a first pressure level controlled by the electronic control unit;
   a second oil circuit connected to each of said first and third oil routing channels, and operable to provide oil at a second pressure level which is different from the first pressure level, wherein the first and second oil circuits are sufficiently separated from one another so as to maintain separate and independent hydraulic pressures therein, such that they may be operated at different pressures from one another; and
   a plurality of operational sensors mounted on the engine;
   wherein during operation, said electronic control unit is operable to control operation of at least one of the first and second oil circuits based in part on the input received from the plurality of operational sensors for achieving desired pre-loading of the first and second bearing assemblies.

9. A turbocharger system according to claim 8, wherein said plurality of sensors comprises a turbocharger rotary speed sensor.

10. A turbocharger system according to claim 9, wherein said electronic control unit is operable to control the second oil circuit such that reduced pre-load is applied to bearing assemblies at low engine speed, and increased pre-load is applied to the bearing assemblies at high engine speed.

11. A turbocharger system according to claim 8, wherein each of the first oil circuit and the second oil circuit receives oil stored in an oil pan of the engine.

12. A turbocharger system according to claim 8, wherein the third oil routing channel is arranged between said first and second oil routing channels.

13. A turbocharger system according to claim 8, further comprising an oil pressure sensor operatively associated with the first and second oil routing channels; wherein said control unit is configured to receive input from said oil pressure sensor, and further control the operation of the second oil circuit for regulating the oil pressure applied the first and second bearing assemblies for achieving desired pre-loading thereof based in part on the input received from said oil pressure sensor.

14. A method of operating a turbocharger apparatus on an internal combustion engine having a first oil circuit and a second oil circuit, said turbocharger apparatus having a pair of axially separated bearing assemblies, said method comprising the steps of:
   a) sensing a plurality of engine operating parameters via a plurality of sensors associated with the internal combustion engine;
   b) providing oil to an internal cavity of the turbocharger apparatus from the first oil circuit at a first pressure level;
   c) controlling operation of at least one of the first and second oil circuits for said engine via an electronic control unit, based on the sensed engine operating parameters; and
   d) applying a variable hydraulic preload to said pair of bearing assemblies via the operation of at least one of said first and second oil circuits, wherein oil from the second oil circuit is provided at a second pressure level which is different from the first pressure level.

15. A method according to claim 14, wherein the sensed engine operating parameters include turbocharger rotary speed.

16. A method according to claim 14, wherein said electronic control unit is operable to control at least one of the first and second oil circuits such that reduced pre-load is applied to bearing assemblies at low engine speed, and increased pre-load is applied to the bearing assemblies at high engine speed.

17. A method according to claim 14, wherein the second oil circuit is separate from the first oil circuit.

18. A method according to claim 14, wherein each of the first oil circuit and the second oil circuit receives oil stored in an oil pan of the engine.

19. A method according to claim 14, wherein the second oil circuit receives oil from a source different from an oil pan of the engine.

20. A method according to claim 14, wherein said control unit receives input from an oil pressure sensor operatively associated with at least one of first and second oil routing channels, and further controls the operation of at least one of the first and second oil circuits for regulating pressure applied to the first and second bearing assemblies for achieving desired pre-loading thereof based in part on the input received from the oil pressure sensor.

* * * * *